US012587481B2

(12) United States Patent
Shahdad et al.

(10) Patent No.: US 12,587,481 B2
(45) Date of Patent: Mar. 24, 2026

(54) ROUTER PACKET QUEUING

(71) Applicant: Boost SubscriberCo L.L.C.,
Englewood, CO (US)

(72) Inventors: Mohammad Dawood Shahdad,
Aurora, CO (US); Daniel Steeves,
Lakewood, CO (US)

(73) Assignee: Boost SubscriberCo L.L.C.,
Englewood, CO (US)

( * ) Notice: Subject to any disclaimer, the term of this
patent is extended or adjusted under 35
U.S.C. 154(b) by 265 days.

(21) Appl. No.: 18/213,164

(22) Filed: Jun. 22, 2023

(65) Prior Publication Data

US 2024/0430204 A1 Dec. 26, 2024

(51) Int. Cl.
*H04L 47/24* (2022.01)
*H04W 28/02* (2009.01)

(52) U.S. Cl.
CPC ......... *H04L 47/24* (2013.01); *H04W 28/0268*
(2013.01)

(58) Field of Classification Search
CPC ........................... H04L 47/24; H04W 28/0268
See application file for complete search history.

(56) References Cited

U.S. PATENT DOCUMENTS

| | | | | |
|---|---|---|---|---|
| 6,449,650 B1* | 9/2002 | Westfall | .............. | H04L 12/5601 |
| | | | | 709/227 |
| 9,264,320 B1* | 2/2016 | Shevenell | ........... | H04L 47/6235 |
| 2014/0280961 A1* | 9/2014 | Martinez | ................ | H04L 41/40 |
| | | | | 709/226 |
| 2015/0149611 A1* | 5/2015 | Lissack | ................... | H04L 41/22 |
| | | | | 709/224 |
| 2018/0262599 A1* | 9/2018 | Firestone | .............. | H04L 45/745 |
| 2022/0021605 A1* | 1/2022 | Bagwell | ................ | H04L 45/586 |
| 2022/0317893 A1* | 10/2022 | Kalman | ................ | G06F 16/273 |
| 2023/0006889 A1* | 1/2023 | Thyagaturu | ......... | H04L 41/5054 |
| 2023/0224258 A1* | 7/2023 | Karacali-Akyamac | ..................... | |
| | | | | H04L 47/801 |
| | | | | 709/226 |
| 2023/0362053 A1* | 11/2023 | Huang | ................ | H04L 41/5003 |
| 2024/0314106 A1* | 9/2024 | Tuber | ................. | H04L 63/0236 |
| 2024/0430204 A1* | 12/2024 | Shahdad | ................. | H04L 47/24 |
| 2025/0219949 A1* | 7/2025 | Shen | ................... | H04L 63/0227 |

* cited by examiner

*Primary Examiner* — David R Lazaro
(74) *Attorney, Agent, or Firm* — Kipman T. Werking;
Frontier IP Law PLLC

(57) ABSTRACT

A disclosed method may include (i) implementing, within a
cloud computing platform, a hierarchical quality-of-service
policy that includes a parent quality-of-service sub-policy in
relation to a child quality-of-service sub-policy, (ii) receiv-
ing telecommunication traffic as part of a cellular service
platform implemented through the cloud computing plat-
form, and (iii) applying, within the cloud computing plat-
form, the hierarchical quality-of-service policy to the tele-
communication traffic to satisfy a predetermined level of
quality of service.

12 Claims, 8 Drawing Sheets

100

100

500

| Classes | DSCP Values | MPLS EXP |
|---|---|---|
| Signaling | CS7 | exp 7 |
| Network-Control (BGP, BFD) | cs6, af33 | exp 6 |
| Voice-EF-Signaling | EF, CS5 | exp 5 |
| Cos2-V (Conversational Video) | CS4, AF41,42,43 | exp 4 |
| Cos2 (embb), Streaming | CS3, af31,32,33 | exp 3 |
| Data | AF21,22,23 | exp 2 |
| Standard-oam | CS2,CS1 | exp 1 |
| Default | Whatever Left | exp 0 |

702    704    706

716 718 720 722 724 726 728 730

700

ROUTER PACKET QUEUING

BRIEF SUMMARY

The present disclosure is generally directed to router packet queuing. As described in more detail below, an example method may include implementing, within a cloud computing platform, a hierarchical quality-of-service policy that includes a parent quality-of-service sub-policy in relation to a child quality-of-service sub-policy, (ii) receiving telecommunication traffic as part of a cellular service platform implemented through the cloud computing platform, and (iii) applying, within the cloud computing platform, the hierarchical quality-of-service policy to the telecommunication traffic to satisfy a predetermined level of quality of service.

In some examples, the parent quality-of-service sub-policy specifies a logical limitation indicated by the cloud computing platform.

In some examples, the child quality-of-service sub-policy divides an amount of the telecommunication traffic, as limited by the parent quality-of-service sub-policy, into different traffic flows corresponding to different classes of telecommunication traffic.

In some examples, the logical limitation indicated by the cloud computing platform is lower than a physical capacity of the cloud computing platform.

In some examples, the cloud computing platform comprises a publicly available cloud computing platform.

In some examples, the publicly available cloud computing platform comprises an on-demand cloud computing platform.

In some examples, the cloud computing platform partners with the cellular service platform for provisioning of cellular services.

In some examples, the child quality-of-service sub-policy divides an amount of the telecommunication traffic, as limited by the parent quality-of-service sub-policy, into different traffic flows corresponding to different classes of telecommunication traffic, the different classes of telecommunication traffic comprising at least three of: signaling network-control; voice-signaling; conversational video; boost enhanced mobile broadband; data; operation, administration, and maintenance; or default.

In some examples, the hierarchical quality-of-service policy is implemented within the cloud computing platform rather than being implemented through a geographic premises of data centers managed by the cellular service platform.

In some examples, different classes of telecommunication traffic are marked by respective differentiated services code point tags.

An example system may include at least one processor and at least one memory coupled to the at least one processor, the at least one memory having computer executable instructions stored thereon that, when executed by the at least one processor, cause operations to be performed, the operations including: (i) implementing, within a cloud computing platform, a hierarchical quality-of-service policy that includes a parent quality-of-service sub-policy in relation to a child quality-of-service sub-policy, (ii) receiving telecommunication traffic as part of a cellular service platform implemented through the cloud computing platform, and (iii) applying, within the cloud computing platform, the hierarchical quality-of-service policy to the telecommunication traffic to satisfy a predetermined level of quality of service.

An example computer-readable medium may include instructions that, when executed by at least one physical processor of a computing device, cause the computing device to perform operations including (i) implementing, within a cloud computing platform, a hierarchical quality-of-service policy that includes a parent quality-of-service sub-policy in relation to a child quality-of-service sub-policy, (ii) receiving telecommunication traffic as part of a cellular service platform implemented through the cloud computing platform, and (iii) applying, within the cloud computing platform, the hierarchical quality-of-service policy to the telecommunication traffic to satisfy a predetermined level of quality of service.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
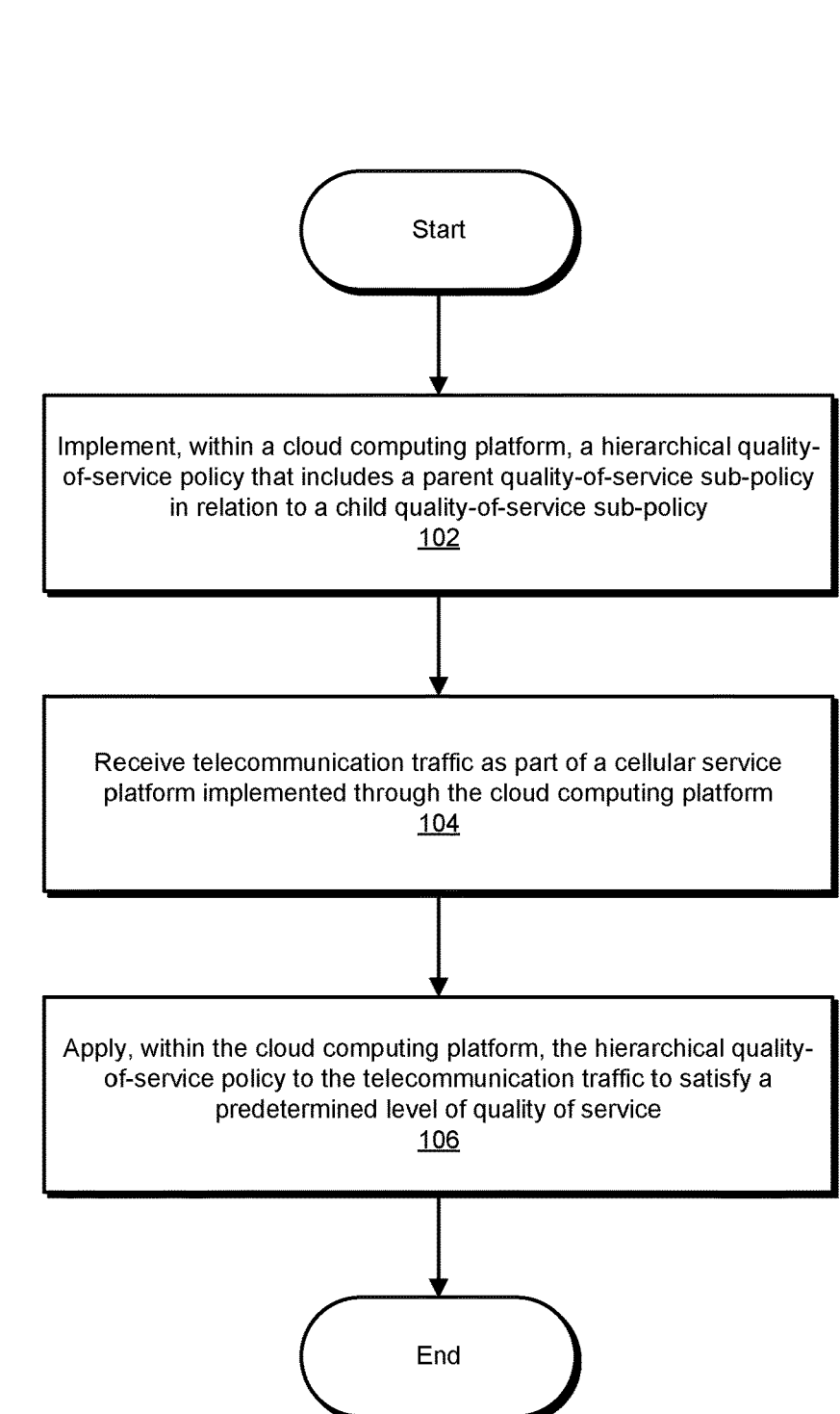
FIG. 1 shows a flow diagram for an example method for router packet queuing.

FIG. 1 shows a flow diagram for an example method 100 for router packet queuing. As further shown in this figure, at step 102, one or more of the systems described herein may implement, within a cloud computing platform, a hierarchical quality-of-service policy that includes a parent quality-of-service sub-policy in relation to a child quality-of-service sub-policy. Subsequently, at step 104, one or more of the systems described herein may receive telecommunication traffic as part of a cellular service platform implemented through the cloud computing platform. Lastly, at step 106, one or more of the systems described herein may apply, within the cloud computing platform, the hierarchical quality-of-service policy to the telecommunication traffic to satisfy a predetermined level of quality-of-service. As used herein, the term "hierarchical quality-of-service policy" can generally refer to a combination hierarchical quality-of-service policy that includes one sub-policy having a level of priority over another sub-policy, consistent with the discussion below. In some examples, a hierarchical quality-of-service policy may refer to a quality-of-service policy that distinguishes between different levels, schedulers, and/or queues, corresponding to network traffic. In further examples, a hierarchical quality-of-service policy may apply one sub-policy and/or scheduler prior to applying another one. Further details regarding method 100, as well as additional details and various different embodiments, will be described in more detail below in connection with FIGS. 2-7.

Figure 2:
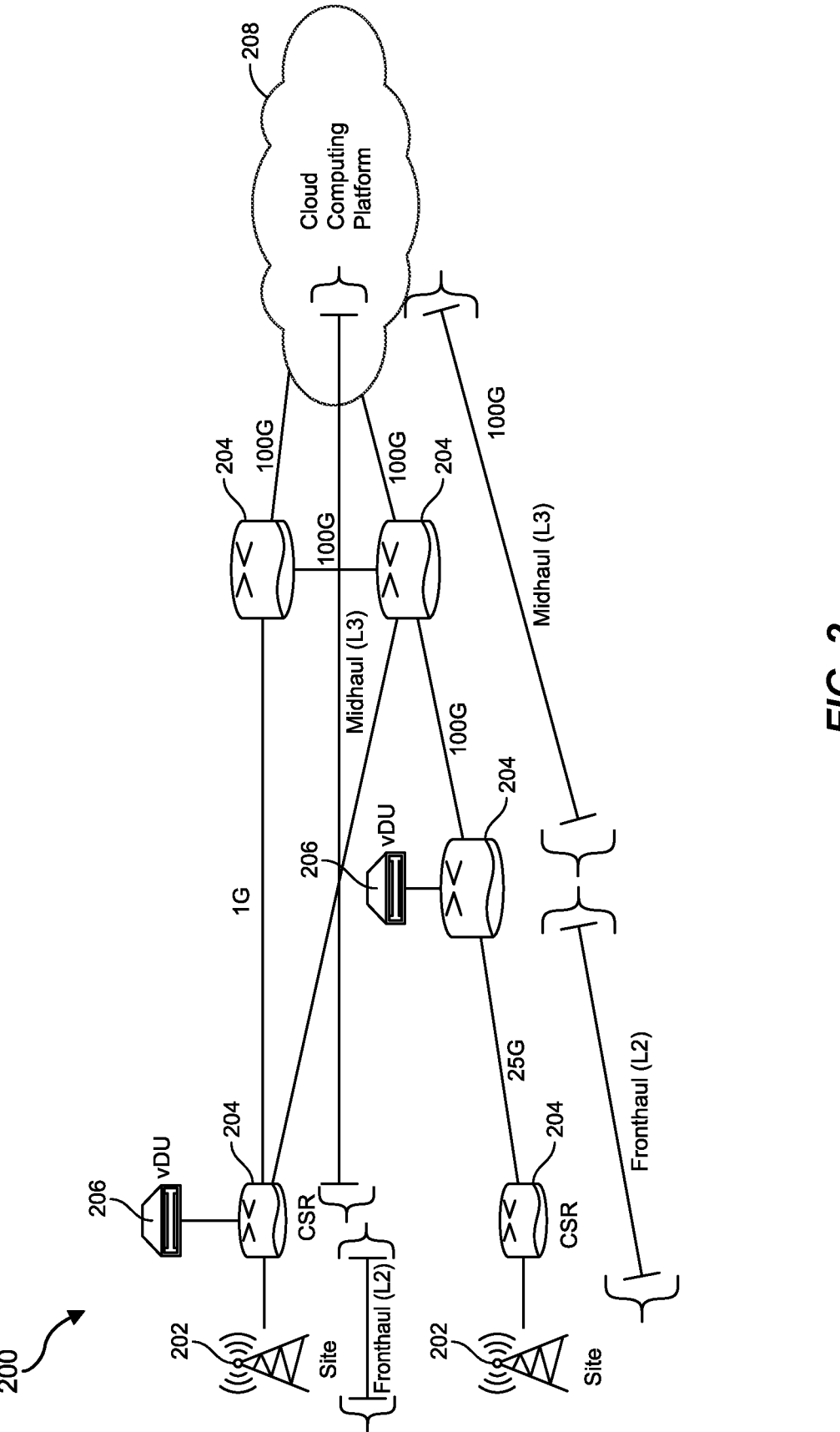
FIG. 2 shows a diagram for a simplified open radio access network.

FIG. 2 shows a diagram 200 for a simplified open radio access network. As further shown in this figure, diagram 200 may further include multiple instances of a cellular site 202, multiple instances of a router 204 (e.g., including one or more cell site routers), multiple instances of a distributed unit 206, and a cloud computing platform 208. FIG. 2 helps to highlight an on-premises infrastructure, which can correspond to the elements of diagram 200 outside of cloud computing platform 208. Various ones or all of these infrastructure components, including cellular base stations, routers, distributed units, and edge data centers, can be operated or managed by a cellular service provider. In contrast to the on-premises infrastructure, quality-of-service can also be implemented in cloud computing platform 208, as discussed in more detail below. In other words, the hierarchical quality-of-service policy of the present disclosure can be implemented within the cloud computing platform rather than being implemented through a geographic premises of data centers managed by the cellular service platform. In contrast, generally speaking, related methodologies for providing quality-of-service in the context of a cellular service provider do not implement quality-of-service policies within the core of a public cloud or other cloud computing platform.

For context, and as further shown in FIG. 2, an open radio access network can be divided into fronthaul, midhaul, or backhaul sections. The fronthaul section can refer to the section between a radio unit and a distributed unit, which can include a layer 2 network. The midhaul section can refer to the section between a distributed unit and a centralized unit, which can include a layer 3 network. Lastly, the backhaul section can refer to the section between the centralized unit and the data network, which can include a layer 3 network.

In various examples of the technology described herein, the various instances of user equipment and network functions generate traffic (control plane and user plane) in terms of data flow. The transport devices (e.g., routers) might only have visibility into aggregated traffic in the network. Thus, the packet header DSCP, MPLS EXP, or L2 802.1 P bits values can be helpful for routers to classify traffic into different traffic classes.

In various examples, quality-of-service ensures that the same data flow within the network has the same treatment under certain conditions. Nevertheless, different data flows may have different treatments during data congestion. Both user data and application-to-application data flows can be managed according to quality-of-service policies within this configuration. Various ones or all routers on the data path can have a consistent quality of service policy from the perspective of the data flow. Different data encapsulation configurations (e.g., IPv4, MPLS, L2) can represent the same type of service information and corresponding network packet headers properly. Network transport devices (e.g., routers) might not change packet header type of service bits. Accordingly, in various configurations, user applications and network functions can mark the type of service bits independently.

Figure 3:
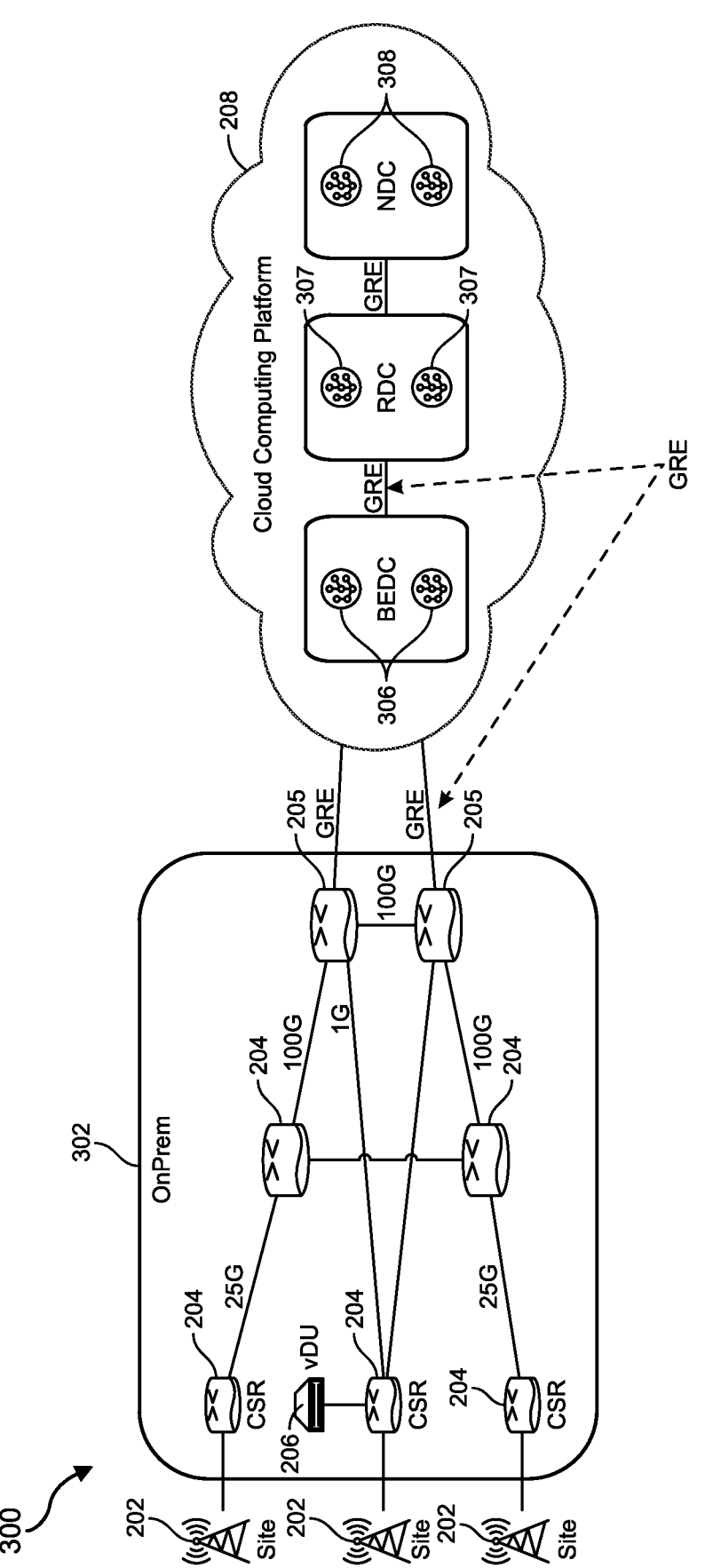
FIG. 3 shows a diagram indicating a connection between an on-premises domain of a cellular service platform and a cloud computing platform domain that partners with the cellular service platform.

FIG. 3 shows a diagram 300 indicating a connection between an on-premises domain of a cellular service platform and a cloud computing platform domain that partners with the cellular service platform. In some examples, the cloud computing platform includes a publicly available cloud computing platform and/or an on-demand cloud computing platform. Similar to FIG. 2, diagram 300 may include multiple instances of a cellular site 202, an on-premises geographic area 302 that can be operated by a cellular service provider, and a cloud computing platform 208. On-premises geographic area 302 may further include multiple instances of a router 204, and multiple instances of edge data centers and corresponding routers 205. Routers 205 may further communicate, through generic routing encapsulation tunneling with cloud computing platform 208, including breakout edge data centers 306, regional data centers 307, and/or national data centers 308.

FIG. 3 helps to highlight how, in various embodiments of the technology of the present disclosure, quality-of-service may be implemented within the domain of cloud computing platform 208 rather than being implemented within the domain of on-premises geographic area 302. In related methodologies, quality-of-service and class-of-service policies may include bandwidth reservation or control to guarantee the reliable delivery of certain types of network traffic. Nevertheless, the introduction of cloud computing platform 208 may introduce one or more limitations, and these limitations may result in quality-of-service being performed in a somewhat different manner than in these related methodologies, as discussed in more detail below.

Figure 4:
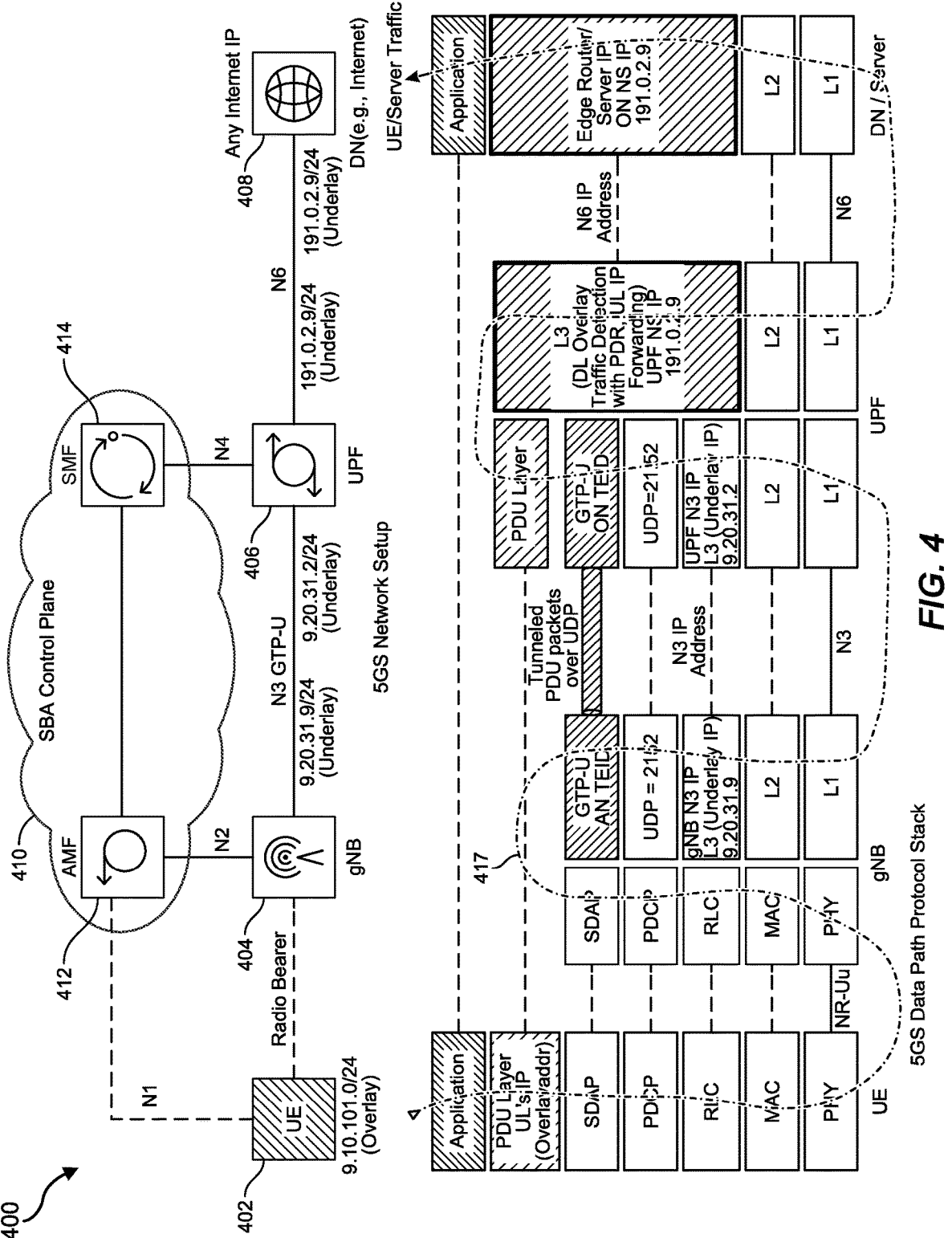
FIG. 4 shows a diagram indicating a 5G system data path protocol stack.

For further context, FIG. 4 shows a diagram 400 indicating a 5G system data path protocol stack. The top portion of diagram 400 may indicate how an instance of user equipment 402 may connect with a cellular base station or gNB 404, which may further connect with the user plane function 406. Between cellular base station 404 and user plane function 406, a service-based control plane 410 may include an access and mobility function 412 and a session management function 414, as further shown in this figure. Diagram

400 also further illustrates how user plane function 406 may further connect to an external wide area network or data network, such as the Internet. The bottom portion of diagram 400 may further indicate a data path 417 of a network packet or other item of information through various network layers at each one of the user equipment, gNB, user plane function, and/or data network or server.

Figure 5:
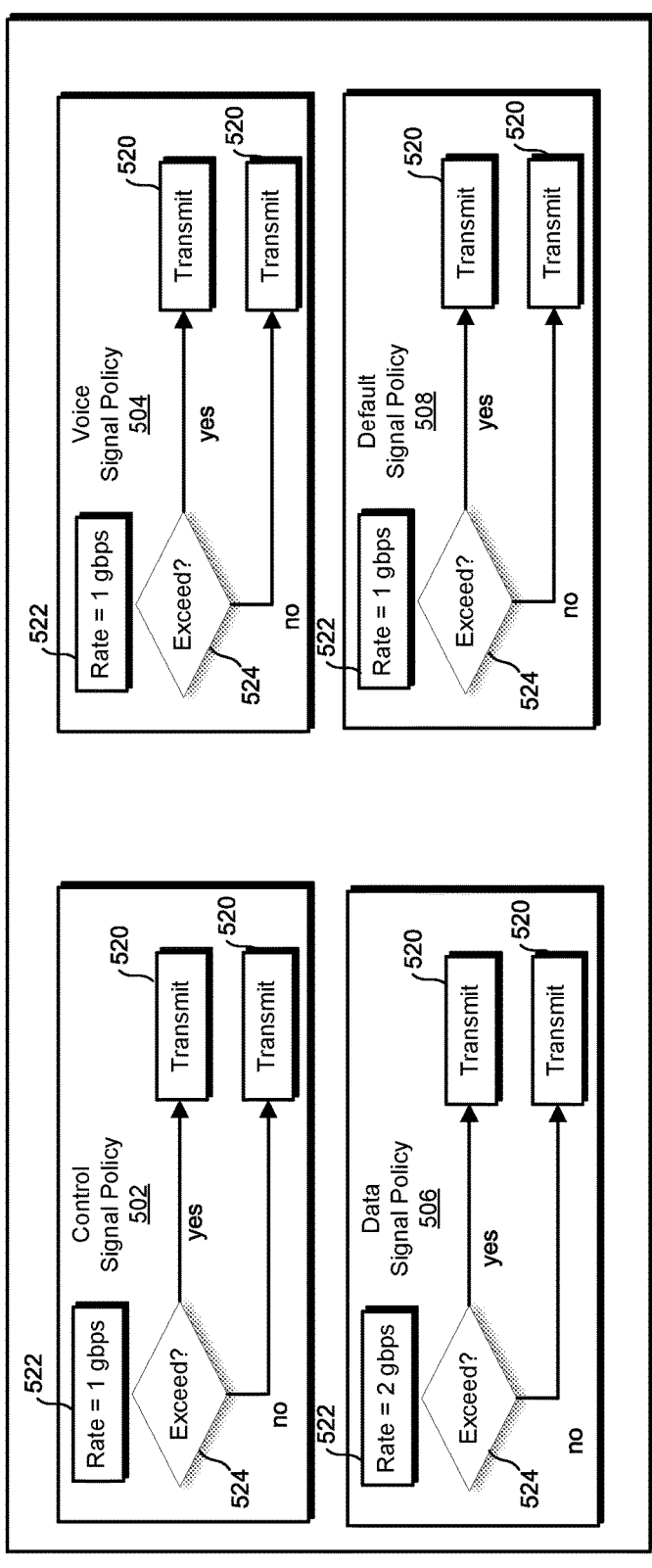
FIG. 5 shows example code indicating a generic routing encapsulation policy map.

FIG. 5 shows a simplified block diagram 500 for a routing encapsulation policy map. The example of this figure is used merely for illustrative purposes. Diagram 500 helps to show one aspect of an embodiment for performing quality-of-service within the context of a cellular service platform coordinating with a cloud computing platform, as further discussed above.

In particular, diagram 500 helps to illustrate an inventive technique for performing quality-of-service within one or more of the contexts highlighted in FIGS. 2-4. Most the time in a virtualized environment it can be impossible to perform quality-of-service, due to the fact that there is an unknown constraint corresponding to the cloud computing platform. When a network administrator or operator owns and operates its own physical infrastructure, then the network administrator would also know the corresponding constraint. The network administrator would, in that example, have a particular level of physical capacity associated with a given interface. Illustrative examples of such limitations on physical capacity might be 100 gig or 400 gig, etc. In related methodologies, quality-of-service can be performed based upon this physical constraint, which again can be readily ascertainable due to the fact that the network administrator is on-premises. In such scenarios, one or more logical constraints may also be present, and nevertheless the network administrator would still understand the overall physical environment and corresponding physical constraints. In contrast, in the context of a cellular service provider implementing cellular services through a cloud computing platform, the cellular service provider itself might not necessarily control or manage the physical environment. Despite this lack of information, the network administrator might nevertheless be required to work or operate within the constraints that the cloud computing platform establishes, including arbitrary or logical constraints that apply independent of any physical constraints.

The usage of quality-of-service within the context of a cellular service platform partnering with a cloud computing platform becomes relevant, in particular, in the case of voice traffic. Voice traffic can be very high-priority traffic. Accordingly, the cellular service platform may prioritize this voice traffic and also take one or more measures to ensure that, if one or more voice network packets are received, while congestion is being experienced, then the voice network packet should be prioritized first before forwarding anything else.

To address the limitations outlined above that are associated with the provisioning of cellular services through a cloud computing platform, diagram 500 indicates a routing encapsulation policy map, which can be defined in a programming language or operating system for a network router, such as the Cisco Internetworking Operating System. As shown, diagram 500 corresponds to a child quality-of-service sub-policy that divides an amount of telecommunication traffic, as limited by a parent quality-of-service sub-policy (see FIG. 6), into different traffic flows corresponding to different classes of telecommunication traffic. In particular, diagram 500 further indicates how different portions of telecommunication traffic may be classified into one or more of different respective classes, which may further include control (control signal policy 502), data (data signal policy 506), voice (voice signal policy 504), and default (default signal policy 508).

Diagram 500 also further illustrates how each one of control signal policy 502, data signal policy 506, voice signal policy 504, and default signal policy 508 may respectively include a bandwidth rate constraint 522, as well as a constraint exceeded policy rule 524. For each respective class of telecommunications network traffic, bandwidth rate constraint 522 specifies the constraint in terms of gigabits per second. Similarly, constraint exceeded policy rule 524 specifies different instances of an action step 520 to be performed in case the corresponding constraint has been exceeded or not. In the example of diagram 500, action step 520 is always "transmit" and this is enabled, in part, because of the tolerance or bandwidth provided by the parent quality-of-service sub-policy discussed below in connection with FIG. 6.

Diagram 500 also further indicates how each one of these different classifications of telecommunication traffic may be associated with, or assigned, a particular bandwidth constraint. For example, telecommunication traffic that has been classified as control traffic has been assigned a bandwidth constraint of 1 gbps or gigabits per second. Similarly, telecommunication traffic that has been classified as data traffic has been assigned a bandwidth constraint of 2 gbps. Furthermore, telecommunication traffic that has been classified as voice traffic has been assigned a bandwidth constraint of 1 gbps. Lastly, telecommunication traffic that has been classified as default traffic has been assigned a bandwidth constraint of 1 gbps. Moreover, these various bandwidth constraints might appropriately divide up a total bandwidth constraint of 5 gbps, where the communication traffic that has been classified as data traffic receives effectively twice as much bandwidth as the remaining three classes of network traffic shown within diagram 500, and as discussed in more detail above. This total bandwidth constraint of 5 gbps might correspond to a logical constraint that is imposed upon the cellular service platform by the corresponding cloud computing platform with which the cellular service platform may be partnering for the provisioning of cellular services. This logical constraint may, therefore, not necessarily indicate, or be associated with, any particular physical constraint of the cloud computing platform, which might actually have much more physical capacity than the logical constraint would suggest.

Diagram 500 further illustrates how, according to this child sub-policy for performing quality-of-service, corresponding network packets are instructed to "transmit" regardless of whether the amount of network packets conforms to, or exceeds, the respective policy for control, data, voice, and default classifications, respectively (see the instances of action step 520). This allows network packets to be transmitted, in a scenario where one or more of these classification constraints has been exceeded, so long as an overall constraint (i.e., the 5 gbps constraint in FIG. 6, discussed below), remains satisfied. By way of illustrative example, if 2 gbps of control network traffic is received, and is needing transmission, this extra 1 gbps (over the 1 gbps constraint for control signal policy 502) can be substituted from excess capacity that is currently unused within one of the other remaining classification constraints. To be even more particular, if only 1 gbps of data network traffic is being used, this leaves an extra 1 gbps of data that can be used for control network traffic, but only so long as the overall total bandwidth constraint of the parent sub-policy is not violated.

Figure 6:
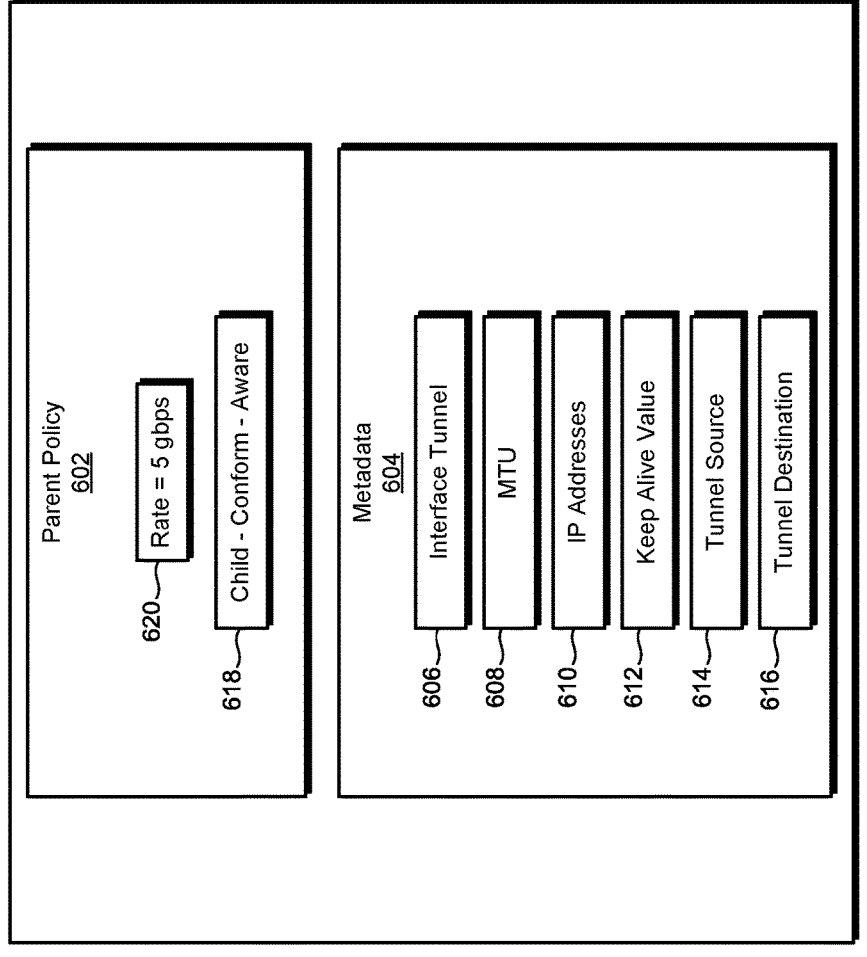
FIG. 6 shows example code indicating a generic routing encapsulation patent policy map.
Figure 6:

FIG. 6 shows a block diagram 600 corresponding to a routing encapsulation parent policy map. As shown, diagram 600 may further include parent policy 602, which can specify a bandwidth rate constraint 620. Parent policy 602 may also further specify a child-conform-aware command 618, which enables parent policy 602 to prioritize conforming traffic from a child-level policy (see diagram 500) over exceeding and/or violating traffic, rather than treating all child-level traffic the same or agnostic. The parent quality-of-service sub-policy of diagram 600 may sit above, or take priority over, the child sub-policy corresponding to diagram 500. Diagram 600 specifies an overall policy rate, or bandwidth constraint, of 5 gbps. As outlined above, this bandwidth constraint may have been indicated, or necessitated, by the cloud computing platform partnering with the cellular service provider for the provisioning of cellular services. In other words, although one or more components of the cloud computing platform may have significantly higher excess physical capacity, in terms of physical infrastructure, for one or more reasons the administrator or manager of the cloud computing platform can establish a lower logical bandwidth constraint, which in this example is 5 gbps. Thus, regardless of how the 5 gbps is divided up (e.g., according to diagram 500), the total amount of bandwidth should not exceed 5 gbps. This interaction or arrangement can be noteworthy in the sense that the dropping of network packets is, in related methodologies, performed at the level associated with diagram 500, rather than at the level associated with diagram 600, but the dropping of network packets has been shifted upward, within this hierarchical quality-of-service framework, to address the limitations associated with cloud computing platforms, as discussed at length above. For completeness, FIG. 6 also shows how parent policy 602 can be associated with various items of metadata 604, which can further specify an interface tunnel 606, a maximum transmission unit 608, Internet Protocol addresses 610, a keep alive value 612, a tunnel source identifier 614, and/or a tunnel destination identifier 616.

The usage of the child-conform-aware command 618 and/or a comparable or related command (e.g., within another programming or networking language), enables the intelligent application of the child sub-policy corresponding to diagram 500 and the parent sub-policy corresponding to diagram 600. As another illustrative example, the reader can consider a scenario where one gbps of control network traffic is being processed consistent with the corresponding bandwidth constraint for control signal policy 502, but five gbps of data network traffic is being processed in violation of the corresponding bandwidth constraint for data signal policy 506. In this example, the total amount of bandwidth exceeds the overall bandwidth constraint of the parent sub-policy (see bandwidth rate constraight 620), and the technology of the present disclosure is intelligent enough to drop corresponding network packets that are violating the corresponding sub-policy constraint (e.g., violating the bandwidth constraint for telecommunications traffic classified as data) rather than the network packets that are not violating their corresponding sub-policy constraint (e.g., not violating the constraint for telecommunications traffic classified as control signals). In other words, at the level of the parent sub-policy, the hierarchical quality-of-service policy is intelligent enough to not just drop packets without regard to their classification, but instead to distinguish between network packets that are guaranteed or reserved consistent with a respective bandwidth constraint of the child sub-policy, on the one hand, and network packets that are in violation of a respective bandwidth constraint of the child sub-policy, as discussed above and shown in FIGS. 5-6.

Figure 7:
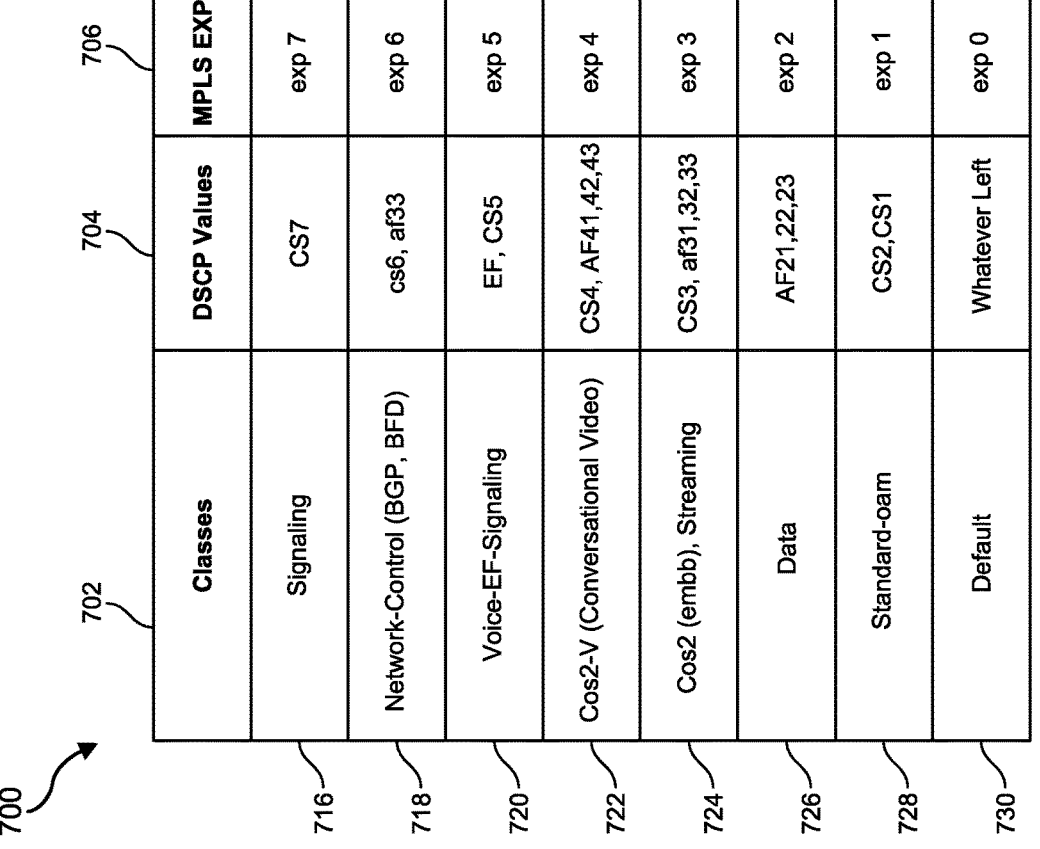
FIG. 7 shows a diagram indicating respective quality-of-service policies for different classes of telecommunication traffic.

FIG. 7 shows a diagram 700, including columns 702-706 and rows 716-730, indicating related aspects of respective quality-of-service policies for different classes of telecommunication traffic. As further shown in this figure, in some examples, the child quality-of-service sub-policy divides an amount of the telecommunication traffic, as limited by the parent quality-of-service sub-policy, into different traffic flows corresponding to different classes of telecommunication traffic, and these different classes of telecommunication traffic may include any two or more of: signaling network-control; voice-signaling; conversational video; boost enhanced mobile broadband; data; operation, administration, and maintenance; or default. Diagram 700 also indicates how, in some examples, the different classes of telecommunication traffic are marked by respective differentiated services code point tags (see column 704).

Figure 8:
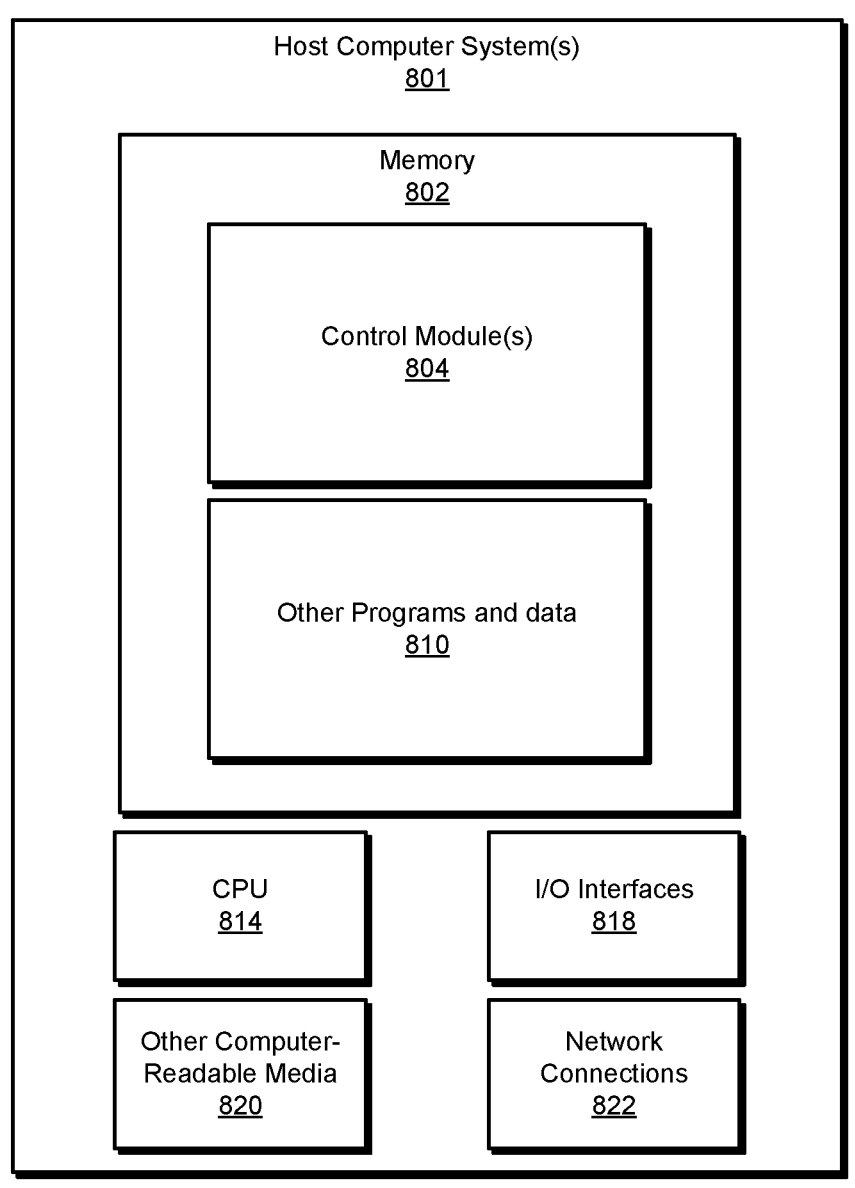
FIG. 8 shows an example computer system that may facilitate the performance of one or more of the methods described herein.

FIG. 8 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computer system(s) 801. For example, such computer system(s) 801 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems or components described herein. Memory 802 may also store other programs and data 810, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
implementing, within a cloud computing platform, a hierarchical quality-of-service policy that includes a parent quality-of-service sub-policy in relation to a child quality-of-service sub-policy;
receiving telecommunication traffic as part of a cellular service platform implemented through the cloud computing platform; and
applying, within the cloud computing platform, the hierarchical quality-of-service policy to the telecommunication traffic to satisfy a predetermined level of quality of service;
wherein:
the parent quality-of-service sub-policy specifies a logical bandwidth limitation indicated by the cloud computing platform that is lower than a physical capacity of the cloud computing platform;
the child quality-of-service sub-policy divides an amount of the telecommunication traffic, as limited by the parent quality-of-service sub-policy, into different traffic flows corresponding to different classes of telecommunication traffic; and
the parent quality-of-service sub-policy applies to a tunnel interface within the cloud computing platform.

2. The method of claim 1, wherein the cloud computing platform comprises a publicly available cloud computing platform.

3. The method of claim 2, wherein the publicly available cloud computing platform comprises an on-demand cloud computing platform.

4. The method of claim 1, wherein the cloud computing platform partners with the cellular service platform for provisioning of cellular services.

5. The method of claim 1, wherein the different classes of telecommunication traffic comprise at least three of:
network control signaling;
voice signaling;

conversational video;
enhanced mobile broadband;
data;
operations, administration, and maintenance; or
default.

6. The method of claim 1, wherein the different classes of telecommunication traffic are marked by respective differentiated services code point tags.

7. A system comprising:
at least one processor; and
at least one memory coupled to the at least one processor, the at least one memory having computer executable instructions stored thereon that, when executed by the at least one processor, cause operations to be performed, the operations including:
implementing, within a cloud computing platform, a hierarchical quality-of-service policy that includes a parent quality-of-service sub-policy in relation to a child quality-of-service sub-policy;
receiving telecommunication traffic as part of a cellular service platform implemented through the cloud computing platform; and
applying, within the cloud computing platform, the hierarchical quality-of-service policy to the telecommunication traffic to satisfy a predetermined level of quality of service;
wherein:
the parent quality-of-service sub-policy specifies a logical bandwidth limitation indicated by the cloud computing platform that is lower than a physical capacity of the cloud computing platform;
the child quality-of-service sub-policy divides an amount of the telecommunication traffic, as limited by the parent quality-of-service sub-policy, into different traffic flows corresponding to different classes of telecommunication traffic; and
the parent quality-of-service sub-policy applies to a tunnel interface within the cloud computing platform.

8. The system of claim 7, wherein the cloud computing platform comprises a publicly available cloud computing platform.

9. The system of claim 8, wherein the publicly available cloud computing platform comprises an on-demand cloud computing platform.

10. The system of claim 7, wherein the cloud computing platform partners with the cellular service platform for provisioning of cellular services.

11. The system of claim 7, wherein the different classes of telecommunication traffic comprise at least three of:
network control signaling;
voice signaling;
conversational video;
enhanced mobile broadband;
data;
operations, administration, and maintenance; or
default.

12. A non-transitory computer-readable medium encoding instructions that, when executed by at least one physical processor of a computing device, cause the computing device to perform operations including:
implementing, within a cloud computing platform, a hierarchical quality-of-service policy that includes a parent quality-of-service sub-policy in relation to a child quality-of-service sub-policy;
receiving telecommunication traffic as part of a cellular service platform implemented through the cloud computing platform; and applying, within the cloud computing platform, the hierarchical quality-of-service policy to the telecommunication traffic to satisfy a predetermined level of quality of service;

wherein:

the parent quality-of-service sub-policy specifies a logical bandwidth limitation indicated by the cloud computing platform that is lower than a physical capacity of the cloud computing platform;

the child quality-of-service sub-policy divides an amount of the telecommunication traffic, as limited by the parent quality-of-service sub-policy, into different traffic flows corresponding to different classes of telecommunication traffic; and the parent quality-of-service sub-policy applies to a tunnel interface within the cloud computing platform.

* * * * *